(12) United States Patent
Viitanen et al.

(10) Patent No.: US 9,294,010 B2
(45) Date of Patent: Mar. 22, 2016

(54) METHOD FOR CONTROLLING SWITCHING BRANCH OF THREE-LEVEL CONVERTER AND SWITCHING BRANCH FOR THREE-LEVEL CONVERTER

(71) Applicant: ABB Oy, Helsinki (FI)

(72) Inventors: Tero Viitanen, Vantaa (FI); Mikko Saarinen, Helsinki (FI)

(73) Assignee: ABB TECHNOLOGY OY, Helsinki (FI)

( * ) Notice: Subject to any disclaimer, the term of this patent is extended or adjusted under 35 U.S.C. 154(b) by 0 days.

(21) Appl. No.: 14/211,048

(22) Filed: Mar. 14, 2014

(65) Prior Publication Data

US 2014/0268940 A1    Sep. 18, 2014

(30) Foreign Application Priority Data

Mar. 14, 2013 (EP) .................................. 13159177

(51) Int. Cl.
| | | |
|---|---|---|
| *H02M 7/797* | (2006.01) | |
| *H02M 7/538* | (2007.01) | |
| *H02M 7/5395* | (2006.01) | |
| *H02M 7/5387* | (2007.01) | |
| *H02M 7/32* | (2006.01) | |
| *H02M 7/487* | (2007.01) | |
| *H02H 7/122* | (2006.01) | |
| *H02M 1/32* | (2007.01) | |

(52) U.S. Cl.
CPC ............ *H02M 7/797* (2013.01); *H02H 7/1225* (2013.01); *H02M 7/487* (2013.01); *H02M 1/32* (2013.01); *H02M 7/538* (2013.01); *H02M 7/5387* (2013.01); *H02M 7/5395* (2013.01); *H02M 7/53873* (2013.01)

(58) Field of Classification Search
USPC ...................... 363/97, 98, 131, 132
See application file for complete search history.

(56) References Cited

U.S. PATENT DOCUMENTS

| | | | | |
|---|---|---|---|---|
| 5,155,675 A | * | 10/1992 | Maruyama et al. ............. | 363/98 |
| 5,729,652 A | * | 3/1998 | Hanson ......................... | 388/811 |
| 5,874,834 A | * | 2/1999 | New ................................ | 326/39 |
| 6,369,543 B1 | * | 4/2002 | Masselus et al. ............. | 318/700 |
| 6,392,907 B1 | * | 5/2002 | Ichikawa ........................ | 363/98 |
| 7,206,211 B2 | * | 4/2007 | Blidberg et al. ............... | 363/132 |

(Continued)

OTHER PUBLICATIONS

Search Report dated Jul. 25, 2013, by the European Patent Office for Application No. 13159177.

(Continued)

*Primary Examiner* — Timothy J Dole
*Assistant Examiner* — Bryan R Perez
(74) *Attorney, Agent, or Firm* — Buchanan Ingersoll & Rooney PC (57) ABSTRACT

Exemplary embodiments are directed to a method for controlling a switching branch of a three-level converter to enter a stop state. The switching branch including a first semiconductor switch and a second semiconductor switch, a first diode and a second diode, a third semiconductor switch and a fourth semiconductor switch, a third diode, and a fourth diode, a fifth semiconductor switch and a sixth semiconductor switch, a fifth diode, and a sixth diode, and a manner of controlling the semiconductor switches. When the switching branch is set to enter a stop state, current flowing in a main circuit of the switching branch is transferred in a controlled manner to diodes that conduct the current, when all the semiconductor switches of the main circuit of the converter are turned OFF.

16 Claims, 4 Drawing Sheets

(56) References Cited

U.S. PATENT DOCUMENTS

| | | | |
|---|---|---|---|
| 7,339,803 B2* | 3/2008 | Nojima | 363/37 |
| 7,508,640 B2 | 3/2009 | Knapp et al. | |
| 8,537,581 B2* | 9/2013 | Wagoner et al. | 363/95 |
| 2001/0048605 A1* | 12/2001 | Kurokami et al. | 363/56.03 |
| 2006/0056209 A1* | 3/2006 | Blidberg et al. | 363/63 |
| 2006/0197491 A1* | 9/2006 | Nojima | 318/801 |
| 2007/0159749 A1* | 7/2007 | Oka | 361/93.1 |
| 2008/0204959 A1* | 8/2008 | Knapp et al. | 361/100 |
| 2011/0280055 A1* | 11/2011 | Nielsen | 363/131 |
| 2012/0218795 A1* | 8/2012 | Mihalache | 363/97 |

OTHER PUBLICATIONS

Brückner et al., "The Active NPC Converter and Its Loss-Balancing Control", IEEE Transactions on Industrial Electronics, Jun. 2005, pp. 855-868, vol. 52, No. 3.

Fazio et al., "Fault Detection and Reconfiguration Strategy for ANPC Converters", 15$^{th}$ International Power Electronics and Motion Control Conference, Sep. 2012, pp. DS1b.17-1 to DS1b.17-5.

Andler et al., "Experimental Investigation of the Communications of a 3L-ANPC Phase Leg Using 4.5-kV-5.5-kA IGCTs", IEEE Transactions on Industrial Electronics, Nov. 2013, pp. 4820-4830, vol. 60, No. 11.

Ceballos et al., "Performance Evaluation of Fault-Tolerant Neutral-Point-Clamped Converters", IEEE Transactions on Industrial Electronics, Aug. 2010, pp. 2709-2718, vol. 57, No. 8.

Lezana et al., "Survey on Fault Operation on Multilevel Inverters", IEEE Transactions on Industrial Electronics, Jul. 2010, pp. 2207-2218, vol. 57, No. 7.

Li et al., "Application of Active NPC Converter on Generator Side for MW Direct-driven Wind Turbine", Applied Power Electronics Conference and Exposition (APEC), Feb. 2010, pp. 1010-1017.

Li et al., "Three-Level Active Neutral-Point-Clamped (ANPC) Converter with Fault Tolerant Ability", Applied Power Electronics Conference and Exposition, Feb. 2009, pp. 840-845.

* cited by examiner

METHOD FOR CONTROLLING SWITCHING BRANCH OF THREE-LEVEL CONVERTER AND SWITCHING BRANCH FOR THREE-LEVEL CONVERTER

RELATED APPLICATION(S)

This application claims priority under 35 U.S.C. §119 to European application 13159177.8 filed in Europe on Mar. 14, 2013, the content of which is hereby incorporated by reference in its entirety.

FIELD

The disclosure relates to a method for controlling a switching branch of a three-level converter to enter a stop state, and a switching branch for a three-level converter.

BACKGROUND INFORMATION

Three-level converters can be converters that have three DC poles. In addition to positive and negative DC poles, they have a neutral DC pole. Examples of three-level neutral-point-clamped converters have been described in T. Brückner, S. Bernet and H. Güldner, "The Active NPC Converter and Its Loss-Balancing Control", IEEE Transactions on Industrial Electronics, Vol. 52, No. 3, June 2005.

Figure 1:
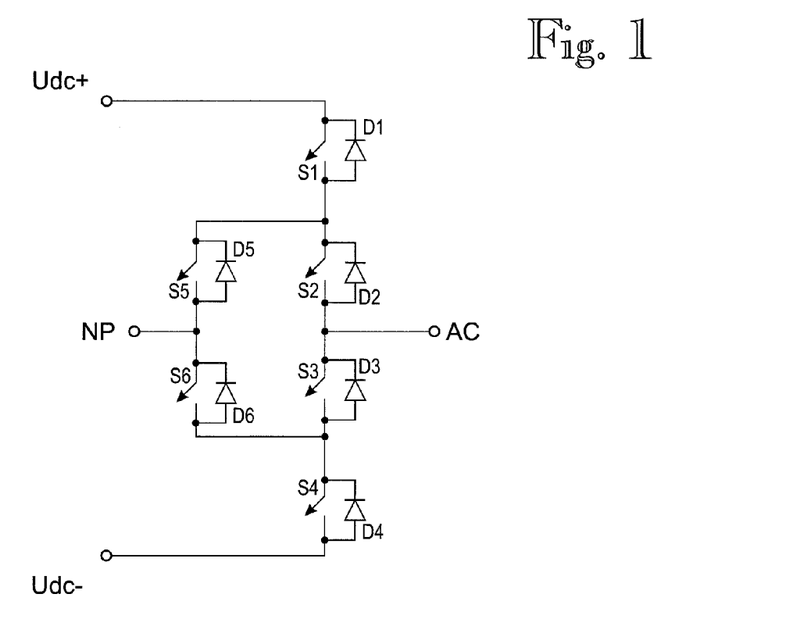
FIG. 1 shows a circuit diagram of a switching branch of a three-level converter according to a known implementation.

FIG. 1 shows an example of a main circuit of a switching branch of a three-level converter according to a known implementation. The switching branch includes six diodes D1 to D6 and six controllable semiconductor switches S1 to S6. A converter including one or more switching branches, like that of FIG. 1, can operate as a rectifier or as an inverter. The switches S1 to S6 can be controlled according to a desired modulation scheme.

When a three-level converter is set to enter a stop state, in which all the semiconductor switches of the main circuit of the converter can be turned OFF and a possible remaining current flowing in the circuit flows through diodes D1 and D2 or D3 and D4 until going to zero, it should be carried out safely in case of a fault situation. U.S. Pat. No. 7,508,640 discloses a method for fault handling in a converter circuit, in which method a fault current path is first detected and on the basis of this information a suitable fault switching sequence is then performed. In the method disclosed the switching status of each semiconductor switch is observed and the fault situation is then determined.

A possible problem related to the above solution is that the detection and determination of the fault should be performed phase-specifically. As a result, each phase of the converter should detect the fault in order to carry out the suitable fault switching sequence. This, in turn, can cause a delay to the response to the fault and possibly cause damage to the converter equipment.

SUMMARY

An exemplary method for controlling a switching branch of a three-level converter to enter a stop state is disclosed, the switching branch including: a first controllable semiconductor switch and a second controllable semiconductor switch connected in series between a positive direct current pole and an alternating current pole of the switching branch, wherein the first controllable semiconductor switch is connected to the positive direct current pole; a first diode connected in parallel to the first controllable semiconductor switch, and a second diode connected in parallel to the second controllable semiconductor switch; a third controllable semiconductor switch and a fourth controllable semiconductor switch connected in series between a negative direct current pole and the alternating current pole of the switching branch, wherein the fourth controllable semiconductor switch is connected to the negative direct current pole; a third diode connected in parallel to the third controllable semiconductor switch, and a fourth diode connected in parallel to the fourth controllable semiconductor switch; a fifth controllable semiconductor switch connected between a neutral direct current pole and a connection point between the first and second controllable semiconductor switches; a sixth controllable semiconductor switch connected between the neutral direct current pole and a connection point between the third and fourth controllable semiconductor switches; a fifth diode connected in parallel to the fifth controllable semiconductor switch, and a sixth diode connected in parallel to the sixth controllable semiconductor switch, the method comprising: determining a state of the controllable semiconductor switches; and a) if the first controllable semiconductor switch and the second controllable semiconductor switch are ON and the sixth controllable semiconductor switch is OFF, controlling the first controllable semiconductor switch to turn OFF substantially simultaneously when the sixth controllable semiconductor switch turns ON; controlling, after a first predetermined delay, the second controllable semiconductor switch to turn OFF; and controlling, after a second predetermined delay, the sixth controllable semiconductor switch to turn OFF, b) if the first controllable semiconductor switch, the second controllable semiconductor switch and the sixth controllable semiconductor switch are ON, controlling the first controllable semiconductor switch to turn OFF; controlling, after the first predetermined delay, the second controllable semiconductor switch to turn OFF; and controlling, after the second predetermined delay, the sixth controllable semiconductor switch to turn OFF, c) if the second controllable semiconductor switch and the fifth controllable semiconductor switch are ON, controlling the fifth controllable semiconductor switch to turn OFF substantially simultaneously when the sixth controllable semiconductor switch turns ON; controlling, after the first predetermined delay, the second controllable semiconductor switch to turn OFF; and controlling, after the second predetermined delay, the sixth controllable semiconductor switch to turn OFF, d) if the third controllable semiconductor switch and the fourth controllable semiconductor switch are ON and the fifth controllable semiconductor switch is OFF, controlling the fourth controllable semiconductor switch to turn OFF substantially simultaneously when the fifth controllable semiconductor switch turns ON; controlling, after the first predetermined delay, the third controllable semiconductor switch to turn OFF; and controlling, after the second predetermined delay, the fifth controllable semiconductor switch to turn OFF, e) if the third controllable semiconductor switch, the fourth controllable semiconductor switch and the fifth controllable semiconductor switch are ON, controlling the fourth controllable semiconductor switch to turn OFF; controlling, after the first predetermined delay, the third controllable semiconductor switch to turn OFF; and controlling, after the second predetermined delay, the fifth controllable semiconductor switch to turn OFF, or f) if the third controllable semiconductor switch and the sixth controllable semiconductor switch are ON, controlling the fifth controllable semiconductor switch to turn ON substantially simultaneously when the sixth controllable semiconductor switch turns OFF; controlling, after the first predetermined delay, the third controllable semiconductor switch to turn OFF; and controlling, after the second predetermined delay, the fifth controllable semiconductor switch to turn OFF.

A switching branch for a three-level converter is disclosed, the switching branch comprising: a first controllable semiconductor switch and a second controllable semiconductor switch connected in series between a positive direct current pole and an alternating current pole of the switching branch, wherein the first controllable semiconductor switch is connected to the positive direct current pole; a first diode connected in parallel to the first controllable semiconductor switch, and a second diode connected in parallel to the second controllable semiconductor switch; a third controllable semiconductor switch and a fourth controllable semiconductor switch connected in series between a negative direct current pole and the alternating current pole of the switching branch, wherein the fourth controllable semiconductor switch is connected to the negative direct current pole; a third diode connected in parallel to the third controllable semiconductor switch, and a fourth diode connected in parallel to the fourth controllable semiconductor switch; a fifth controllable semiconductor switch connected between a neutral direct current pole and a connection point between the first and second controllable semiconductor switches; a sixth controllable semiconductor switch connected between the neutral direct current pole and a connection point between the third and fourth controllable semiconductor switches; a fifth diode connected in parallel to the fifth controllable semiconductor switch, and a sixth diode connected in parallel to the sixth controllable semiconductor switch; and means for controlling the controllable semiconductor switches, wherein the means can be configured, when setting the switching branch to enter a stop state, to determine a state of the controllable semiconductor switches, and after determining the state of the controllable semiconductor switches, to: a) if the first controllable semiconductor switch and the second controllable semiconductor switch are ON and the sixth controllable semiconductor switch is OFF, control the first controllable semiconductor switch to turn OFF substantially simultaneously when the sixth controllable semiconductor switch turns ON; control, after a first predetermined delay, the second controllable semiconductor switch to turn OFF; and control, after a second predetermined delay, the sixth controllable semiconductor switch to turn OFF, b) if the first controllable semiconductor switch, the second controllable semiconductor switch and the sixth controllable semiconductor switch can be ON, control the first controllable semiconductor switch to turn OFF; control, after the first predetermined delay, the second controllable semiconductor switch to turn OFF; and control, after the second predetermined delay, the sixth controllable semiconductor switch to turn OFF, c) if the second controllable semiconductor switch and the fifth controllable semiconductor switch can be ON, control the fifth controllable semiconductor switch to turn OFF substantially simultaneously when the sixth controllable semiconductor switch turns ON; control, after the first predetermined delay, the second controllable semiconductor switch to turn OFF; and control, after the second predetermined delay, the sixth controllable semiconductor switch to turn OFF, d) if the third controllable semiconductor switch and the fourth controllable semiconductor switch can be ON and the fifth controllable semiconductor switch is OFF, control the fourth controllable semiconductor switch to turn OFF substantially simultaneously when the fifth controllable semiconductor switch turns ON; control, after the first predetermined delay, the third controllable semiconductor switch to turn OFF; and control, after the second predetermined delay, the fifth controllable semiconductor switch to turn OFF, e) if the third controllable semiconductor switch, the fourth controllable semiconductor switch and the fifth controllable semiconductor switch can be ON, control the fourth controllable semiconductor switch to turn OFF; control, after the first predetermined delay, the third controllable semiconductor switch to turn OFF; and control, after the second predetermined delay, the fifth controllable semiconductor switch to turn OFF, or f) if the third controllable semiconductor switch and the sixth controllable semiconductor switch can be ON, control the fifth controllable semiconductor switch to turn ON substantially simultaneously when the sixth controllable semiconductor switch turns OFF; control, after the first predetermined delay, the third controllable semiconductor switch to turn OFF; and control, after the second predetermined delay, the fifth controllable semiconductor switch to turn OFF.

An apparatus for controlling a switching branch of a three-level converter to enter a stop state is disclosed, the switching branch including: a first controllable semiconductor switch and a second controllable semiconductor switch connected in series between a positive direct current pole and an alternating current pole of the switching branch, wherein the first controllable semiconductor switch is connected to the positive direct current pole; a first diode connected in parallel to the first controllable semiconductor switch, and a second diode connected in parallel to the second controllable semiconductor switch; a third controllable semiconductor switch and a fourth controllable semiconductor switch connected in series between a negative direct current pole and the alternating current pole of the switching branch, wherein the fourth controllable semiconductor switch is connected to the negative direct current pole; a third diode connected in parallel to the third controllable semiconductor switch, and a fourth diode connected in parallel to the fourth controllable semiconductor switch; a fifth controllable semiconductor switch connected between a neutral direct current pole and a connection point between the first and second controllable semiconductor switches; a sixth controllable semiconductor switch connected between the neutral direct current pole and a connection point between the third and fourth controllable semiconductor switches; a fifth diode connected in parallel to the fifth controllable semiconductor switch, and a sixth diode connected in parallel to the sixth controllable semiconductor switch, the apparatus comprising: a processor; and a memory storing instructions that, when executed by the processor, cause the apparatus to: determine a state of the controllable semiconductor switches; and a) if the first controllable semiconductor switch and the second controllable semiconductor switch are ON and the sixth controllable semiconductor switch is OFF, control the first controllable semiconductor switch to turn OFF substantially simultaneously when the sixth controllable semiconductor switch turns ON; control, after a first predetermined delay, the second controllable semiconductor switch to turn OFF; and control, after a second predetermined delay, the sixth controllable semiconductor switch to turn OFF, b) if the first controllable semiconductor switch, the second controllable semiconductor switch and the sixth controllable semiconductor switch are ON, control the first controllable semiconductor switch to turn OFF; control, after the first predetermined delay, the second controllable semiconductor switch to turn OFF; and control, after the second predetermined delay, the sixth controllable semiconductor switch to turn OFF, c) if the second controllable semiconductor switch and the fifth controllable semiconductor switch are ON, control the fifth controllable semiconductor switch to turn OFF substantially simultaneously when the sixth controllable semiconductor switch turns ON; control, after the first predetermined delay, the second controllable semiconductor switch to turn OFF; and control, after the second predetermined delay, the sixth controllable semiconductor switch to turn OFF, d) if the third controllable semiconductor switch and the fourth controllable semiconductor switch are ON and the fifth controllable semiconductor switch is OFF, control the fourth controllable semiconductor switch to turn OFF substantially simultaneously when the fifth controllable semiconductor switch turns ON; control, after the first predetermined delay, the third controllable semiconductor switch to turn OFF; and control, after the second predetermined delay, the fifth controllable semiconductor switch to turn OFF, e) if the third controllable semiconductor switch, the fourth controllable semiconductor switch and the fifth controllable semiconductor switch are ON, control the fourth controllable semiconductor switch to turn OFF; control, after the first predetermined delay, the third controllable semiconductor switch to turn OFF; and control, after the second predetermined delay, the fifth controllable semiconductor switch to turn OFF, or f) if the third controllable semiconductor switch and the sixth controllable semiconductor switch can be ON, control the fifth controllable semiconductor switch to turn ON substantially simultaneously when the sixth controllable semiconductor switch turns OFF; control, after the first predetermined delay, the third controllable semiconductor switch to turn OFF; and control, after the second predetermined delay, the fifth controllable semiconductor switch to turn OFF.

DESCRIPTION OF THE DRAWINGS

The disclosure will now be explained in greater detail in connection with exemplary embodiments and with reference to the attached drawings, in which.

DETAILED DESCRIPTION

Exemplary embodiments of the present disclosure provide a computer program product, a switching branch for a three-level converter, and a converter for controlling a switching brand of a three-level converter to enter a stop state.

Exemplary embodiments described herein provide that when a switching branch for a three-level converter is set to enter a stop state, a current flowing in a main circuit of the switching branch is transferred in a controlled manner to diodes that conduct the remaining current when all the controllable semiconductor switches of the main circuit of the converter can be turned OFF. The exemplary embodiments of the present disclosure further provide that the switching sequence used is determined on the basis of whether the alternating current pole of the switching branch is connected or was last connected to the positive or negative direct current pole.

Furthermore, exemplary embodiments of the present disclosure provide the advantage that the switching branch for a three-level converter and the whole converter can be set to enter a stop state without unnecessary delay and without performing a phase-specific fault or fault type detection. In addition, exemplary embodiments described herein can be used both in fault situations and in normal situations where the converter is to be stopped for any reason. Moreover, the current in each phase of the converter can be commutated into the final diode via a neutral DC pole potential and thus possible leakage inductances caused by different main circuit configurations do not induce high voltage peaks over power semiconductors.

Exemplary embodiments of the present disclosure are not restricted to any specific system, but can be applied to various electric systems. In addition, the use of the exemplary embodiments described herein are not restricted to any system utilizing a specific basic frequency or to any specific voltage level.

Figure 2:
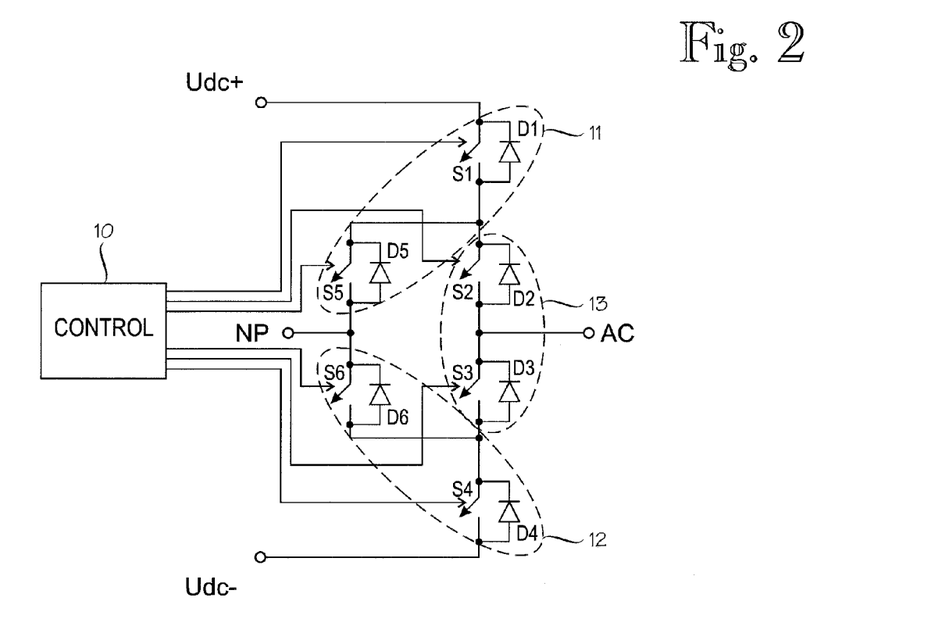
FIG. 2 shows a circuit diagram of a switching branch of a three-level converter according to an exemplary embodiment of the present disclosure.

FIG. 2 shows a circuit diagram of a switching branch of a three-level converter in accordance with an exemplary embodiment of the present disclosure. It should be noted that the Figure only presents basic elements for understanding the disclosure. The switching branch can be one switching branch of a multi-phase converter, such as a three-phase converter, or a switching branch of a one-phase converter, for example. Such a converter can operate as a rectifier and/or as an inverter. The switching branch of FIG. 2 includes an alternating current pole AC, a positive direct current pole Udc+, a negative direct current pole Udc−, and a neutral direct current pole NP. Further, the switching branch includes a first controllable semiconductor switch S1 and a second controllable semiconductor switch S2 connected in series between the positive direct current pole Udc+ and the alternating current pole AC of the switching branch, wherein the first controllable semiconductor switch S1 is connected to the positive direct current pole Udc+. A first diode D1 is connected in parallel to the first controllable semiconductor switch S1 and a second diode D2 is connected in parallel to the second controllable semiconductor switch S2.

Further, the switching branch includes a third controllable semiconductor switch S3 and a fourth controllable semiconductor switch S4 connected in series between the negative direct current pole Udc− and the alternating current pole AC of the switching branch, wherein the fourth controllable semiconductor switch S4 is connected to the negative direct current pole Udc−. A third diode D3 is connected in parallel to the third controllable semiconductor switch S3, and a fourth diode D4 is connected in parallel to the fourth controllable semiconductor switch S4. Further, the switching branch includes a fifth controllable semiconductor switch S5 connected between the neutral direct current pole NP and a connection point between the first controllable semiconductor switch S1 and the second controllable semiconductor switch S2, and a sixth controllable semiconductor switch S6 connected between the neutral direct current pole NP and a connection point between the third controllable semiconductor switch S3 and the fourth controllable semiconductor switch S4. A fifth diode D5 is connected in parallel to the fifth controllable semiconductor switch S5 and a sixth diode D6 is connected in parallel to the sixth controllable semiconductor switch S6. The controllable semiconductor switches S1 to S6 can be IGBTs (Insulated Gate Bipolar Transistor) or FETs (Field-Effect Transistor) or any corresponding controllable semiconductor switches. FIG. 2 further shows a control arrangement 10 via which the switches S1 to S6 can be controlled. The control of the semiconductor switches S1 to S6 can involve one or more additional control components (not shown).

According to an exemplary embodiment, the first semiconductor switch S1, the first diode D1, the fifth semiconductor switch S5 and the fifth diode D5 can reside in a first switching-branch-specific semiconductor module 11, and the fourth semiconductor switch S4, the fourth diode D4, the sixth semiconductor switch S6 and the sixth diode D6 can reside in a second switching-branch-specific semiconductor module 12. In this context, the term 'semiconductor module' refers to a module that includes several semiconductor elements arranged on a common substrate and connected electrically to each other in a suitable manner. Furthermore, the second semiconductor switch S2, the second diode D2, the third semiconductor switch S3 and the third diode D3 can reside in a third switching-branch-specific semiconductor module 13 as shown in FIG. 2.

Figure 3:
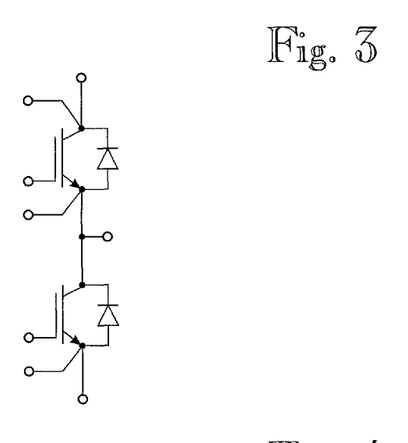
FIG. 3 shows an example of a semiconductor module structure according to an exemplary embodiment of the present disclosure.

FIG. 3 shows an example of a semiconductor module structure according to an exemplary embodiment of the present disclosure. More specifically, FIG. 3 shows an example of a semiconductor module structure by means of which the possible first switching-branch-specific semiconductor module 11, the possible second switching-branch-specific semiconductor module 12 and the possible third switching-branch-specific semiconductor module 13 of FIG. 2 can be implemented. An inverter branch module of FIG. 3 includes two semiconductor switches connected in series with a diode connected in parallel to each in the manner shown in the Figure. By means of the semiconductor module structure described in FIG. 3 or a corresponding structure, the switching branch structure of FIG. 2 is easy to implement.

Figure 4:
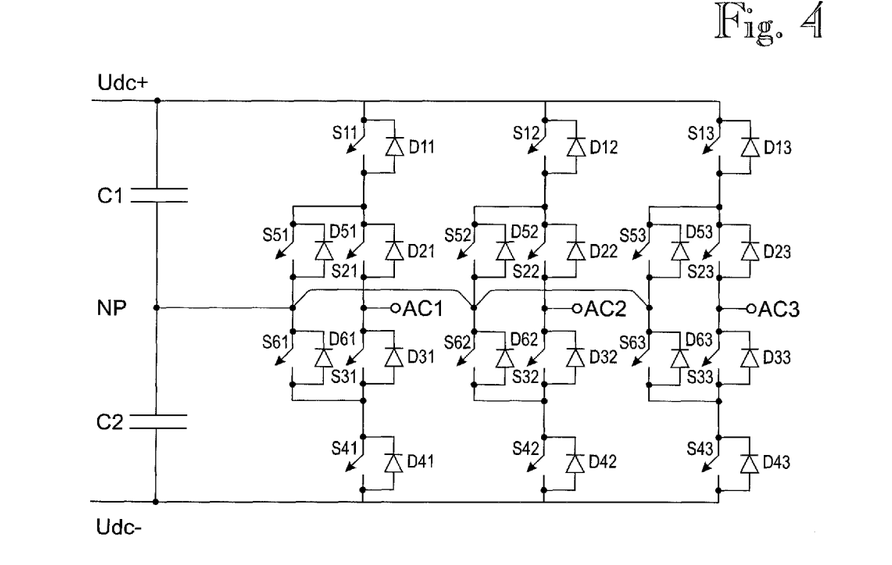
FIG. 4 shows a circuit diagram of a main circuit of a three-phase three-level converter according to an exemplary embodiment of the present disclosure.

According to an exemplary embodiment, a three-phase three-level converter can be implemented by connecting together three switching branches according to any exemplary embodiment described above. FIG. 4 shows a circuit diagram of a main circuit of a three-phase three-level converter according to an exemplary embodiment of the present disclosure. The three switching branches have been connected together by connecting the positive direct current poles Udc+ of each switching branch together, the negative direct current poles Udc− of each switching branch together, and the neutral direct current poles NP of each switching branch together. The Figure shows only those basic components for understanding the disclosure. For the sake of clarity, FIG. 4 does not show the control arrangements for the semiconductor switches. The converter of FIG. 4 can function both as a rectifier and an inverter. It should be noted that the converter circuit configuration could differ from the one shown in FIG. 4 without deviating from the basic idea of the disclosure.

The exemplary three-phase converter includes three switching branches with alternating current poles AC1, AC2 and AC3, respectively. Each switching branch includes a first diode D11, D12, D13, a second diode D21, D22, D23, a third diode D31, D32, D33, a fourth diode D41, D42, D43, a fifth diode D51, D52, D53 and a sixth diode D61, D62, D63 connected as described above in connection with FIG. 2. Each switching branch further includes a first semiconductor switch S11, S12, S13, a second semiconductor switch S21, S22, S23, a third semiconductor switch S31, S32, S33, a fourth semiconductor switch S41, S42, S43, a fifth semiconductor switch S51, S52, S53 and a sixth semiconductor switch S61, S62, S63 connected as described above in connection with FIG. 2. The semiconductor switches S11 to S63 can be IGBTs (Insulated Gate Bipolar Transistor) or FETs (Field-Effect Transistor) or any suitable semiconductor switches as desired. The DC intermediate circuit of the exemplary converter of FIG. 5 can include capacitors C1 and C2 as illustrated. The structure of the intermediate circuit could also be different, depending on the circuit configuration used.

According to an exemplary embodiment, when the converter is to be stopped, outer switches S1 and S4 can be turned OFF first. Substantially simultaneously with the turning OFF of switch S1, NP switch S6 can be turned ON unless it is already ON. In a corresponding manner, substantially simultaneously with the turning OFF of switch S4, NP switch S5 can be turned ON unless it is already ON. Only after these measures can the inner switches S2 and S3 turned OFF, for example, after a first predetermined delay T1. Then, after that the NP switch S5 or S6 that was previously turned ON can be turned OFF, for example after a second predetermined delay T2. The NP switch S5 or S6 that was not specifically turned ON but that could have already been turned ON, when the decision to stop the converter was made, can be turned OFF substantially simultaneously with the turn-off of outer switch S1 or S4.

Figure 5:
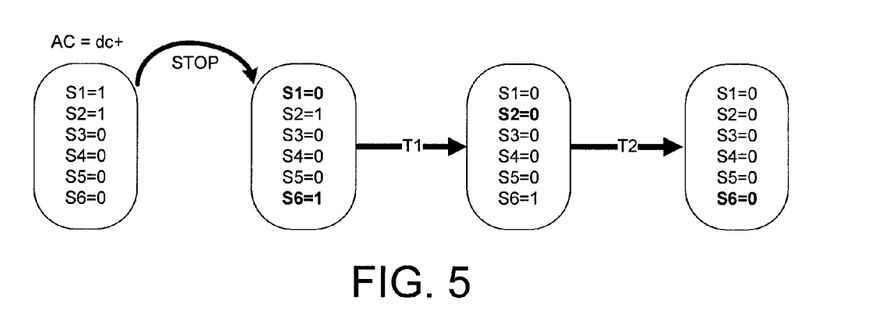
FIG. 5 shows a first switching sequence according to an exemplary embodiment of the present disclosure.

In accordance with the exemplary embodiment of FIG. 4, the switching branch can be controlled to enter a stop state by first determining a state (ON or OFF) of the semiconductor switches of the switching branch. The information on the state of the semiconductor switches can be readily available because of the normal control of the converter. Then, depending on the determined state of the controllable semiconductor switches, one of the following sequences a) to f) is performed:

FIGS. 5-10 illustrate switching sequences according to exemplary embodiments of the present disclosure FIG. 5 shows a first switching sequence according to an exemplary embodiment of the present disclosure. For example, a first switching sequence a) can occur if the first controllable semiconductor switch S1 and the second controllable semiconductor switch S2 can be ON and the sixth controllable semiconductor switch S6 is OFF, then controlling the first controllable semiconductor switch S1 to turn OFF substantially simultaneously when the sixth controllable semiconductor switch S6 turns ON, controlling, after a first predetermined delay T1, the second controllable semiconductor switch S2 to turn OFF, and controlling, after a second predetermined delay T2, the sixth controllable semiconductor switch S6 to turn OFF. This first sequence is illustrated in FIG. 5, which relates to a situation in which the alternating current pole AC is initially connected to the positive direct current pole Udc+. The current initially flows through either the first and second switches S1 and S2 or through the first and second diodes D1 and D2.

Figure 6:
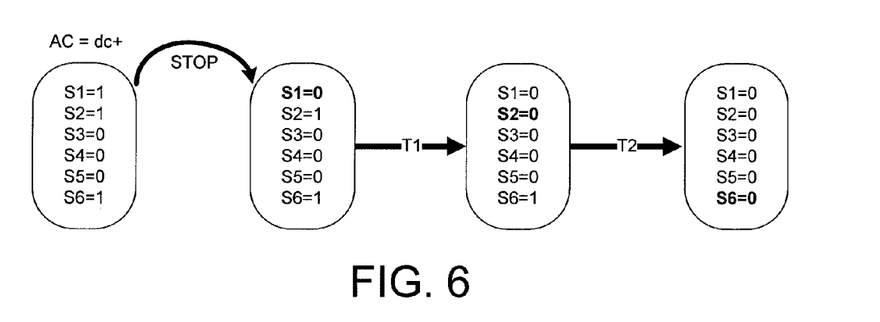
FIG. 6 shows a second switching sequence according to an exemplary embodiment of the present disclosure.

FIG. 6 shows a second switching sequence according to an exemplary embodiment of the present disclosure. For example, a second switching sequence b) can occur if the first controllable semiconductor switch S1, the second controllable semiconductor switch S2 and the sixth controllable semiconductor switch S6 can be ON, then controlling the first controllable semiconductor switch S1 to turn OFF, controlling, after the first predetermined delay T1, the second controllable semiconductor switch S2 to turn OFF, and controlling, after the second predetermined delay T2, the sixth controllable semiconductor switch S6 to turn OFF. This second sequence as illustrated in FIG. 6 relates to a situation in which the alternating current pole AC is initially connected to the positive direct current pole Udc+ and the sixth switch S6 is also ON. The current initially flows through either the first and second switches S1 and S2 or through the first and second diodes D1 and D2.

Figure 7:
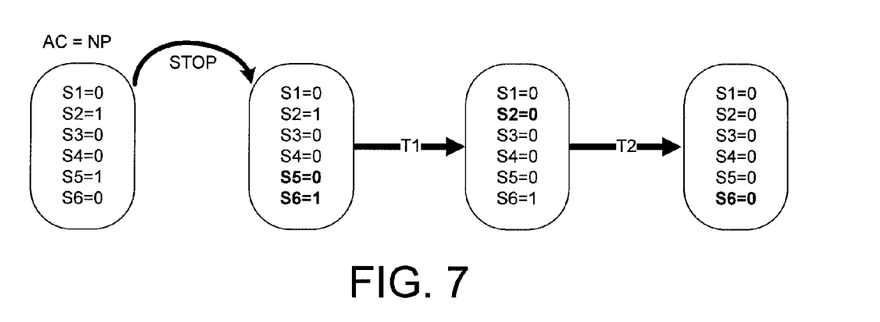
FIG. 7 shows a third switching sequence according to an exemplary embodiment of the present disclosure.

FIG. 7 shows a third switching sequence according to an exemplary embodiment of the present disclosure. For example, a third switching sequence c) can occur if the second controllable semiconductor switch S2 and the fifth controllable semiconductor switch S5 can be ON, then controlling the fifth controllable semiconductor switch S5 to turn OFF substantially simultaneously when the sixth controllable semiconductor switch S6 turns ON, controlling, after the first predetermined delay T1, the second controllable semiconductor switch S2 to turn OFF, and controlling, after the second predetermined delay T2, the sixth semiconductor S6 switch to turn OFF. This third sequence as illustrated in FIG. 7 relates to a situation in which the alternating current pole AC is initially connected to the neutral direct current pole NP. The current initially flows through either the second switch S2 and the fifth diode D5 or through the fifth switch S5 and the second diode D2.

Figure 8:
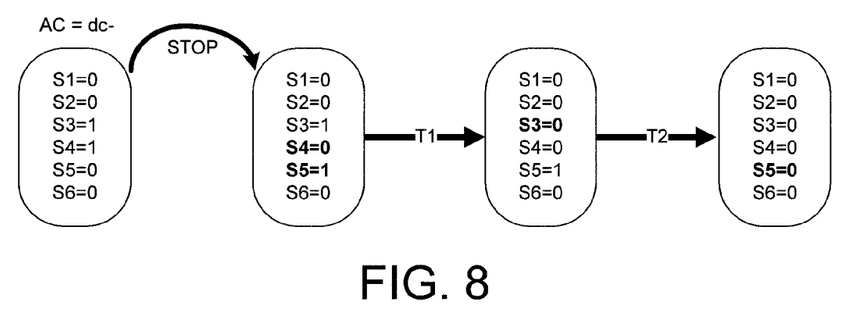
FIG. 8 shows a fourth switching sequence according to an exemplary embodiment of the present disclosure.

FIG. 8 shows a fourth switching sequence according to an exemplary embodiment of the present disclosure. For example, a fourth switching sequence d) can occur if the third controllable semiconductor switch S3 and the fourth controllable semiconductor switch S4 can be ON and the fifth controllable semiconductor switch S5 is OFF, then controlling the fourth controllable semiconductor switch S4 to turn OFF substantially simultaneously when the fifth controllable semiconductor switch S5 turns ON, controlling, after the first predetermined delay T1, the third controllable semiconductor switch S3 to turn OFF, and controlling, after the second predetermined delay T2, the fifth controllable semiconductor switch S5 to turn OFF. This fourth sequence as illustrated in FIG. 8 relates to a situation in which the alternating current pole AC is initially connected to the negative direct current pole Udc−. The current initially flows through either the third and fourth switches S3 and S4 or through the third and fourth diodes D3 and D4.

Figure 9:
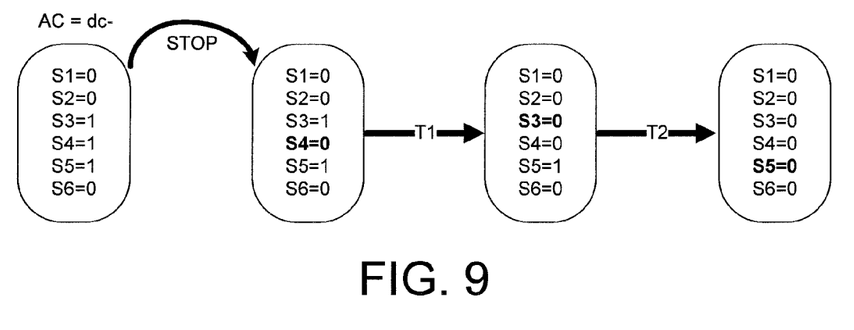
FIG. 9 shows a fifth switching sequence according to an exemplary embodiment of the present disclosure.

FIG. 9 shows a fifth switching sequence according to an exemplary embodiment of the present disclosure. For example, a fifth switching sequence e) can occur if the third controllable semiconductor switch S3, the fourth controllable semiconductor switch S4 and the fifth semiconductor S5 switch can be ON, then controlling the fourth controllable semiconductor switch S4 to turn OFF, controlling, after the first predetermined delay T1, the third controllable semiconductor switch S3 to turn OFF, and controlling, after the second predetermined delay T2, the fifth controllable semiconductor switch S5 to turn OFF. This fifth sequence as illustrated in FIG. 9 relates to a situation in which the alternating current pole AC is initially connected to the negative direct current pole Udc− and the fifth switch S5 is also ON. The current initially flows through either the third and fourth switches S3 and S4 or through the third and fourth diodes D3 and D4.

Figure 10:
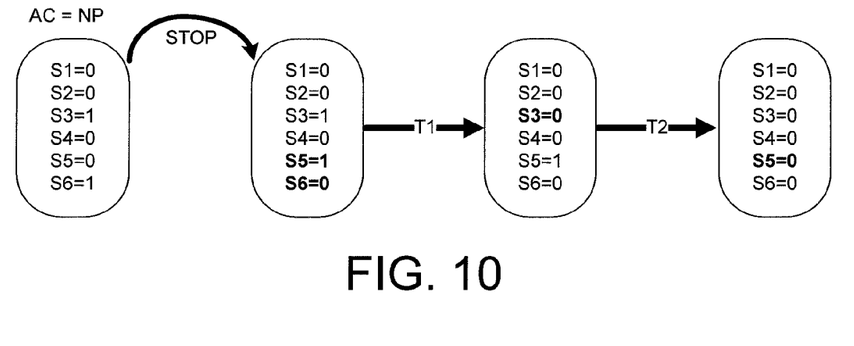
FIG. 10 shows a sixth switching sequence according to an exemplary embodiment of the present disclosure.

FIG. 10 shows a sixth switching sequence according to an exemplary embodiment of the present disclosure. For example, a sixth switching sequence f) can occur if the third controllable semiconductor switch S3 and the sixth controllable semiconductor switch S6 can be ON, then controlling the fifth controllable semiconductor switch S5 to turn ON substantially simultaneously when the sixth controllable semiconductor switch S6 turns OFF, controlling, after the first predetermined delay T1, the third controllable semiconductor switch S3 to turn OFF, and controlling, after the second predetermined delay T2, the fifth controllable semiconductor switch S5 to turn OFF. This sixth sequence as illustrated in FIG. 10 relates to a situation in which the alternating current pole AC is initially connected to the neutral direct current pole NP. The current initially flows through either the third switch S3 and the sixth diode D6 or through the sixth switch S6 and the third diode D3.

According to an exemplary embodiment of the present disclosure, the first predetermined delay T1 can be less than 10 µs (e.g., a settable value 0 µs to 10 µs) and the second predetermined delay T2 can be less than 10 µs (e.g., a settable value 0 µs to 10 µs). However, their value can vary and depends on the type of the power semiconductors used and the structure of the main circuit, for example.

As a result of the above sequences, the current is always commutated to the final diode in a controlled manner such that each switching takes place via a voltage stress of approximately Udc/2, e.g., the voltage over any semiconductor will not equal the total DC voltage Udc. Various turn-off methods can be applied in connection with the above exemplary embodiments. For example, a turn-off of a semiconductor switch can comprise a soft turn-off period during which the gate charge is discharged at a lower speed and after that at a higher speed.

According to another exemplary embodiment of the present disclosure, the switching branch can be controlled to enter a stop state in response to a stop command e.g. from an operator of the converter. According to yet another exemplary embodiment, the switching branch can be controlled to enter a stop state in response to detection of a fault situation. Such a fault situation can occur, for example, in the switching branch of the converter, elsewhere in the converter or in a device connected to the converter, such as a device supplied by the converter, or in a power supply that feeds the converter. An example of the fault situation is a fault in a converter component, or a short circuit or an earth fault in any one of the converter parts. A fault situation can be detected, for example, by means of a specified fault diagnostics functionality, which monitors the operation of the switching branch of the converter or that of the whole converter and detects if discrepancies from normal operation occur. A fault diagnostics functionality of this kind can be incorporated in the control unit 10 or implemented by one or more separate units (not shown).

The control of the semiconductor switches according to the various exemplary embodiments described above can be performed by or via the control arrangement 10, which can also perform the normal modulation control of the switches. It is also possible to use additional or separate logical or physical units (not shown) for performing the control functionality of the disclosure. The functionality of the disclosure could, for example, be implemented using a separate logic arrangement, which could be independent of the normal modulation control of the switches, for example.

The control arrangement 10 and/or a separate logic arrangement controlling the controllable semiconductor switches according to any one of the above exemplary embodiments, or a combination thereof, can be implemented as one unit or as two or more separate units that can be configured to implement the functionality of the various exemplary embodiments. Here the term 'unit' refers to a physical or logical entity, such as a physical device or a part thereof or a software routine. The control arrangement 10 according to any one of the exemplary embodiments described herein can be implemented at least partly by means of one or more computers or corresponding digital signal processing (DSP) equipment provided with suitable software, for example. Such a computer or digital signal processing equipment can include at least a working memory (RAM) providing storage for arithmetical operations, and a central processing unit (CPU), such as a general-purpose digital signal processor.

The CPU can include a set of registers, an arithmetic logic unit, and a CPU control unit. The CPU control unit can be controlled by a sequence of program instructions transferred to the CPU from the RAM. The CPU control unit can contain a number of microinstructions for basic operations. The implementation of microinstructions can vary depending on the CPU design. The program instructions can be coded by a programming language, which can be a high-level programming language, such as C, Java, etc., or a low-level programming language, such as a machine language, or an assembler. The computer can also have an operating system which can provide system services to a computer program written with the program instructions. The computer or other apparatus implementing the disclosure, or a part thereof, can further include suitable input means for receiving for example measurement and/or control data, and output means for outputting for example control data. It is also possible to use analog circuits, programmable logic devices (PLD), such as a field-programmable gate array (FPGA), or discrete electric components and devices for implementing the functionality according to any one of the exemplary embodiments. For example, the control arrangement 10 according to any one of the exemplary embodiments can be implemented at least partly by means of such analog circuits or programmable logic devices, such as an FPGA circuit. An FPGA circuit or another type of a suitable programmable logic device, for example, can be used to implement the logical functions according to any one of the exemplary embodiments.

The disclosure can be implemented in existing system elements or by using separate dedicated elements or devices in a centralized or distributed manner. Present converter switching branches or converters, for example, can comprise programmable logic devices, such as FPGA circuits, or processors and memory that can be utilized in the functions according to exemplary embodiments of the disclosure. Thus, all modifications and configurations specified for implementing an exemplary embodiment of the disclosure for example in existing converter switching branches or converters can be performed as software routines, which can be implemented as added or updated software routines. If at least part of the functionality of the disclosure is implemented by software, such software can be provided as a computer program product including computer program code which, when run on a computer, causes the computer or a corresponding arrangement to perform the functionality according to the disclosure as described above. Such a computer program code can be stored or embodied on a non-transitory computer readable medium, such as a suitable memory, for example, a flash memory or an optical memory, from which it is loadable to the unit or units executing the program code. In addition, such a computer program code implementing the disclosure can be loaded to the unit or units executing the computer program code via a suitable data network, for example, and it can replace or update a possibly existing program code.

Thus, it will be appreciated by those skilled in the art that the present disclosure can be embodied in other specific forms without departing from the spirit or essential characteristics thereof. The presently disclosed exemplary embodiments can be therefore considered in all respects to be illustrative and not restricted. The scope of the disclosure is indicated by the appended claims rather than the foregoing description and all changes that come within the meaning and range and equivalence thereof can be intended to be embraced therein.

What is claimed is:

1. A method for controlling a switching branch of a three-level converter to enter a stop state, the switching branch including:
   a first controllable semiconductor switch and a second controllable semiconductor switch connected in series between a positive direct current pole and an alternating current pole of the switching branch, wherein the first controllable semiconductor switch is connected to the positive direct current pole;
   a first diode connected in parallel to the first controllable semiconductor switch, and a second diode connected in parallel to the second controllable semiconductor switch;
   a third controllable semiconductor switch and a fourth controllable semiconductor switch connected in series between a negative direct current pole and the alternating current pole of the switching branch, wherein the fourth controllable semiconductor switch is connected to the negative direct current pole;
   a third diode connected in parallel to the third controllable semiconductor switch, and a fourth diode connected in parallel to the fourth controllable semiconductor switch;
   a fifth controllable semiconductor switch connected between a neutral direct current pole and a connection point between the first and second controllable semiconductor switches;
   a sixth controllable semiconductor switch connected between the neutral direct current pole and a connection point between the third and fourth controllable semiconductor switches;
   a fifth diode connected in parallel to the fifth controllable semiconductor switch, and a sixth diode connected in parallel to the sixth controllable semiconductor switch, the method comprising:
   determining a state of the controllable semiconductor switches; and
   a) if substantially simultaneously the first controllable semiconductor switch and the second controllable semiconductor switch are ON and the sixth controllable semiconductor switch is OFF,
      controlling substantially simultaneously the first controllable semiconductor switch to turn OFF and the sixth controllable semiconductor switch to turn ON;
      controlling, after a first predetermined delay, the second controllable semiconductor switch to turn OFF; and
      controlling, after a second predetermined delay, the sixth controllable semiconductor switch to turn OFF,
   b) if substantially simultaneously the first controllable semiconductor switch, the second controllable semiconductor switch and the sixth controllable semiconductor switch are ON,
      controlling the first controllable semiconductor switch to turn OFF;
      controlling, after the first predetermined delay, the second controllable semiconductor switch to turn OFF; and
      controlling, after the second predetermined delay, the sixth controllable semiconductor switch to turn OFF,
   c) if substantially simultaneously the second controllable semiconductor switch and the fifth controllable semiconductor switch are ON, controlling substantially simultaneously the fifth controllable semiconductor switch to turn OFF and when the sixth controllable semiconductor switch to turn ON;
controlling, after the first predetermined delay, the second controllable semiconductor switch to turn OFF; and
controlling, after the second predetermined delay, the sixth controllable semiconductor switch to turn OFF,
d) if substantially simultaneously the third controllable semiconductor switch and the fourth controllable semiconductor switch are ON and the fifth controllable semiconductor switch is OFF,
controlling substantially simultaneously the fourth controllable semiconductor switch to turn OFF and when the fifth controllable semiconductor switch to turn ON;
controlling, after the first predetermined delay, the third controllable semiconductor switch to turn OFF; and
controlling, after the second predetermined delay, the fifth controllable semiconductor switch to turn OFF,
e) if substantially simultaneously the third controllable semiconductor switch, the fourth controllable semiconductor switch and the fifth controllable semiconductor switch are ON,
controlling the fourth controllable semiconductor switch to turn OFF;
controlling, after the first predetermined delay, the third controllable semiconductor switch to turn OFF; and
controlling, after the second predetermined delay, the fifth controllable semiconductor switch to turn OFF, or
f) if substantially simultaneously the third controllable semiconductor switch and the sixth controllable semiconductor switch are ON,
controlling substantially simultaneously the fifth controllable semiconductor switch to turn ON and when the sixth controllable semiconductor switch to turn OFF;
controlling, after the first predetermined delay, the third controllable semiconductor switch to turn OFF; and
controlling, after the second predetermined delay, the fifth controllable semiconductor switch to turn OFF.

2. The method of claim 1, wherein the switching branch is controlled to enter a stop state in response to a stop command or detection of a fault situation.

3. The method of claim 2, wherein the fault situation is a fault situation in the switching branch, in the converter or in a device connected to the converter.

4. The method of claim 1, wherein the first predetermined delay is less than 10 µs and the second predetermined delay is less than 10 µs.

5. A computer program product comprising computer program code embodied on a non-transitory computer readable medium, wherein execution of the program code on a computer causes the computer to carry out the steps of the method according to claim 1.

6. A switching branch for a three-level converter, the switching branch comprising:
a first controllable semiconductor switch and a second controllable semiconductor switch connected in series between a positive direct current pole and an alternating current pole of the switching branch, wherein the first controllable semiconductor switch is connected to the positive direct current pole;
a first diode connected in parallel to the first controllable semiconductor switch, and a second diode connected in parallel to the second controllable semiconductor switch;
a third controllable semiconductor switch and a fourth controllable semiconductor switch connected in series between a negative direct current pole and the alternating current pole of the switching branch, wherein the fourth controllable semiconductor switch is connected to the negative direct current pole;
a third diode connected in parallel to the third controllable semiconductor switch, and a fourth diode connected in parallel to the fourth controllable semiconductor switch;
a fifth controllable semiconductor switch connected between a neutral direct current pole and a connection point between the first and second controllable semiconductor switches;
a sixth controllable semiconductor switch connected between the neutral direct current pole and a connection point between the third and fourth controllable semiconductor switches;
a fifth diode connected in parallel to the fifth controllable semiconductor switch, and a sixth diode connected in parallel to the sixth controllable semiconductor switch; and
means for controlling the controllable semiconductor switches, wherein the means can be configured, when setting the switching branch to enter a stop state, to determine a state of the controllable semiconductor switches, and
after determining the state of the controllable semiconductor switches, to:
a) if substantially simultaneously the first controllable semiconductor switch and the second controllable semiconductor switch are ON and the sixth controllable semiconductor switch is OFF,
control substantially simultaneously the first controllable semiconductor switch to turn OFF and the sixth controllable semiconductor switch to turn ON;
control, after a first predetermined delay, the second controllable semiconductor switch to turn OFF; and
control, after a second predetermined delay, the sixth controllable semiconductor switch to turn OFF,
b) if substantially simultaneously the first controllable semiconductor switch, the second controllable semiconductor switch and the sixth controllable semiconductor switch are ON,
control the first controllable semiconductor switch to turn OFF;
control, after the first predetermined delay, the second controllable semiconductor switch to turn OFF; and
control, after the second predetermined delay, the sixth controllable semiconductor switch to turn OFF,
c) if substantially simultaneously the second controllable semiconductor switch and the fifth controllable semiconductor switch are ON,
control substantially simultaneously the fifth controllable semiconductor switch to turn OFF and the sixth controllable semiconductor switch to turn ON;
control, after the first predetermined delay, the second controllable semiconductor switch to turn OFF; and
control, after the second predetermined delay, the sixth controllable semiconductor switch to turn OFF,
d) if substantially simultaneously the third controllable semiconductor switch and the fourth controllable semiconductor switch are ON and the fifth controllable semiconductor switch is OFF, control substantially simultaneously the fourth controllable semiconductor switch to turn OFF and the fifth controllable semiconductor switch to turn ON;

control, after the first predetermined delay, the third controllable semiconductor switch to turn OFF; and control, after the second predetermined delay, the fifth controllable semiconductor switch to turn OFF, e) if substantially simultaneously the third controllable semiconductor switch, the fourth controllable semiconductor switch and the fifth controllable semiconductor switch are ON, control the fourth controllable semiconductor switch to turn OFF;

control, after the first predetermined delay, the third controllable semiconductor switch to turn OFF; and control, after the second predetermined delay, the fifth controllable semiconductor switch to turn OFF, or f) if substantially simultaneously the third controllable semiconductor switch and the sixth controllable semiconductor switch are ON, control substantially simultaneously the fifth controllable semiconductor switch to turn ON and the sixth controllable semiconductor switch to turn OFF;

control, after the first predetermined delay, the third controllable semiconductor switch to turn OFF; and control, after the second predetermined delay, the fifth controllable semiconductor switch to turn OFF.

7. The switching branch of claim 6, wherein the means for controlling the controllable semiconductor switches are configured to set the switching branch to enter a stop state in response to receiving a stop command or an indication of a fault situation.

8. The switching branch of claim 6, wherein
the first controllable semiconductor switch, the first diode, the fifth controllable semiconductor switch and the fifth diode reside in a first switching-branch-specific semiconductor module; and
the fourth controllable semiconductor switch, the fourth diode, the sixth controllable semiconductor switch and the sixth diode reside in a second switching-branch-specific semiconductor module.

9. The switching branch of claim 8, wherein the second controllable semiconductor switch, the second diode, the third controllable semiconductor switch and the third diode reside in a third switching-branch-specific semiconductor module.

10. The switching branch of claim 8, wherein
the second controllable semiconductor switch and the second diode reside in the first switching-branch-specific semiconductor module; and
the third controllable semiconductor switch and the third diode reside in the second switching-branch-specific semiconductor module.

11. The switching branch of claim 6, wherein the means for controlling the controllable semiconductor switches include at least one of one or more analog circuits and one or more programmable logic devices.

12. The switching branch of claim 11, wherein the programmable logic device is a field-programmable gate array.

13. A three-phase three-level converter,
which comprises three switching branches according to claim 6.

14. The three-phase three-level converter of claim 13, wherein the positive direct current poles of each switching branch are connected together, the negative direct current poles of each switching branch are connected together and the neutral direct current poles of each switching branch are connected together.

15. The three-phase three-level converter of claim 14, wherein the means for controlling the controllable semiconductor switches of each of the three switching branches are configured to set each of the three switching branches to enter a stop state substantially simultaneously.

16. An apparatus for controlling a switching branch of a three-level converter to enter a stop state, the switching branch comprising:
a first controllable semiconductor switch and a second controllable semiconductor switch connected in series between a positive direct current pole and an alternating current pole of the switching branch, wherein the first controllable semiconductor switch is connected to the positive direct current pole;
a first diode connected in parallel to the first controllable semiconductor switch, and a second diode connected in parallel to the second controllable semiconductor switch;
a third controllable semiconductor switch and a fourth controllable semiconductor switch connected in series between a negative direct current pole and the alternating current pole of the switching branch, wherein the fourth controllable semiconductor switch is connected to the negative direct current pole;
a third diode connected in parallel to the third controllable semiconductor switch, and a fourth diode connected in parallel to the fourth controllable semiconductor switch;
a fifth controllable semiconductor switch connected between a neutral direct current pole and a connection point between the first and second controllable semiconductor switches;
a sixth controllable semiconductor switch connected between the neutral direct current pole and a connection point between the third and fourth controllable semiconductor switches;
a fifth diode connected in parallel to the fifth controllable semiconductor switch, and a sixth diode connected in parallel to the sixth controllable semiconductor switch,
the apparatus comprising:
a processor; and
a memory storing instructions that, when executed by the processor, cause the apparatus to:
determine a state of the controllable semiconductor switches; and a) if substantially simultaneously the first controllable semiconductor switch and the second controllable semiconductor switch are ON and the sixth controllable semiconductor switch is OFF, control substantially simultaneously the first controllable semiconductor switch to turn OFF and the sixth controllable semiconductor switch to turn ON;

control, after a first predetermined delay, the second controllable semiconductor switch to turn OFF; and control, after a second predetermined delay, the sixth controllable semiconductor switch to turn OFF, b) if substantially simultaneously the first controllable semiconductor switch, the second controllable semiconductor switch and the sixth controllable semiconductor switch are ON, control the first controllable semiconductor switch to turn OFF;

control, after the first predetermined delay, the second controllable semiconductor switch to turn OFF; and control, after the second predetermined delay, the sixth controllable semiconductor switch to turn OFF,
c) if substantially simultaneously the second controllable semiconductor switch and the fifth controllable semiconductor switch are ON,
control substantially simultaneously the fifth controllable semiconductor switch to turn OFF and the sixth controllable semiconductor switch to turn ON;
control, after the first predetermined delay, the second controllable semiconductor switch to turn OFF; and
control, after the second predetermined delay, the sixth controllable semiconductor switch to turn OFF,
d) if substantially simultaneously the third controllable semiconductor switch and the fourth controllable semiconductor switch are ON and the fifth controllable semiconductor switch is OFF,
control substantially simultaneously the fourth controllable semiconductor switch to turn OFF and the fifth controllable semiconductor switch to turn ON;
control, after the first predetermined delay, the third controllable semiconductor switch to turn OFF; and
control, after the second predetermined delay, the fifth controllable semiconductor switch to turn OFF,
e) if substantially simultaneously the third controllable semiconductor switch, the fourth controllable semiconductor switch and the fifth controllable semiconductor switch are ON,
control the fourth controllable semiconductor switch to turn OFF;
control, after the first predetermined delay, the third controllable semiconductor switch to turn OFF; and
control, after the second predetermined delay, the fifth controllable semiconductor switch to turn OFF,
or
f) if substantially simultaneously the third controllable semiconductor switch and the sixth controllable semiconductor switch are ON,
control substantially simultaneously the fifth controllable semiconductor switch to turn ON and the sixth controllable semiconductor switch to turn OFF;
control, after the first predetermined delay, the third controllable semiconductor switch to turn OFF; and
control, after the second predetermined delay, the fifth controllable semiconductor switch to turn OFF.

* * * * *